(12) United States Patent
Snow et al.

(10) Patent No.: US 8,688,118 B2
(45) Date of Patent: Apr. 1, 2014

(54) ACCESS PROCEDURE FOR CALL RE-ESTABLISHMENT

(75) Inventors: Christopher Harris Snow, Waterloo (CA); Nazih Almalki, Waterloo (CA); Ayman Ahmed Abdel-Samad, Waterloo (CA); Dinesh Kumar Arora, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 453 days.

(21) Appl. No.: 12/549,870

(22) Filed: Aug. 28, 2009

(65) Prior Publication Data

US 2011/0053595 A1 Mar. 3, 2011

(51) Int. Cl.
*H04W 36/00* (2009.01)

(52) U.S. Cl.
USPC ............ 455/436; 455/67.11; 455/226.2

(58) Field of Classification Search
USPC ............ 455/436–442, 67.11, 67.13, 226.1, 455/226.2, 226.3
See application file for complete search history.

(56) References Cited

U.S. PATENT DOCUMENTS

| | | | |
|---|---|---|---|
| 6,058,302 A | 5/2000 | Westerberg | |
| 7,162,247 B2 | 1/2007 | Baba et al. | |
| 7,489,928 B2 | 2/2009 | Smith | |
| 7,852,774 B2 | 12/2010 | Shen et al. | |
| 2002/0193111 A1 | 12/2002 | Wallstedt et al. | |
| 2002/0197992 A1 | 12/2002 | Nizri et al. | |
| 2003/0179731 A1 | 9/2003 | Noguchi et al. | |
| 2004/0071112 A1 | 4/2004 | Hsu et al. | |
| 2005/0261017 A1 | 11/2005 | Vaittinen et al. | |
| 2006/0068780 A1 | 3/2006 | Dalsgaard et al. | |
| 2006/0209798 A1* | 9/2006 | Oikarinen et al. | 370/352 |
| 2007/0086388 A1 | 4/2007 | Kang et al. | |
| 2007/0167165 A1 | 7/2007 | Yang et al. | |
| 2008/0167042 A1 | 7/2008 | Kitazoe | |
| 2008/0214225 A1 | 9/2008 | Choukroun et al. | |
| 2009/0017824 A1 | 1/2009 | Lee et al. | |
| 2010/0240367 A1 | 9/2010 | Lee et al. | |
| 2011/0080825 A1* | 4/2011 | Dimou et al. | 370/216 |

FOREIGN PATENT DOCUMENTS

| | | |
|---|---|---|
| CA | 2303367 | 3/1999 |
| CN | 101009926 A | 8/2007 |
| EP | 1806949 | 7/2007 |
| EP | 1809063 | 7/2007 |
| EP | 1809063 A1 | 7/2007 |
| EP | 1909523 | 4/2008 |
| EP | 2056639 A2 | 5/2009 |
| WO | 2009/096883 A1 | 8/2009 |

OTHER PUBLICATIONS

3GPP TS 24.008 v8.5.0, Mobile radio interface Layer 3 specification; Core network protocols; Stage 3 (Release 8).

(Continued)

*Primary Examiner* — Temica M Beamer (57) ABSTRACT

An access procedure for call re-establishment is provided. In a first method, a mobile station, in at least some instances of detecting radio link failure, attempts call re-establishment on multiple cells concurrently. In a second method, a mobile station performs a first random access channel procedure when the mobile station is not aware of at least two cells with enabled call re-establishment, and performs a second random access channel procedure when the mobile station is aware of at least two cells with enabled call re-establishment.

18 Claims, 4 Drawing Sheets

(56) References Cited

OTHER PUBLICATIONS

3GPP TS 45.008 v8.2.0, Radio subsystem link control (Release 8).
3GPP TS 44.018 v8.6.0, Mobile radio interface layer 3 specification; Radio Resource Control (RRC) protocol (Release 8).
3GPP TS 44.060 v8.4.0, General Packet Radio Service (GPRS); Mobile Station (MS)-Base Station System (BSS) interface; Radio Link Control/Medium Access Control (RLC/MAC) protocol (Release 8).
3GPP: "Radio Resource Control (RRC); Protocol Specification", 3GPP TS 25.331 V8.4.0, [Online] vol. 25.331, no. v8.4.0, Sep. 1, 2008, pp. 169-170, 284, XP002580001, Retrieved from the Internet: URL: Http://www.3gpp.org/ftp/Specs/html-info/25331.htm [retrieved on Apr. 28, 2010].
NTT DOCOMO: "Details of L3 filtering in radio link problem detection", 3GPP Draft; R4-083039, 3rd Generation Partnership Project (3GPP), Mobile Competence Centre; 650, Route Des Lucioles; F-06921 Sophia-Antipolis Cedex, France, no. Prague, Czech Republic; 20081106, XP050326240, [retrieved on Nov. 6, 2008].
International Search Report & Written Opinion from International Application No. PCT/IB2010/002081 dated Jan. 26, 2011.
International Search Report & Written Opinion from International Application No. PCT/IB2010/002097 dated Dec. 22, 2010.
3GPP TSG RAN3#57 bis, R3-071876, (Alcatel-Lucent), Impact of Multiple handover preparations on RAN3 specifications, Sophia Antipolis, France, Oct. 8-11, 2007.
3GPP TS 45.008 version 8.3.0 Release 8, Digital cellular telecommunications system (Phase 2+); Radio subsystem link control, Jun. 2009.
3GPP TS 44.018 version 8.7.0 Release 8, Digital cellular telecommunications system (Phase 2+); Mobile radio interface layer 3 specification; Radio Resource Control (RRC) protocol, Jun. 2009.
International Search Report & Written Opinion from International Application No. PCT/IB2010/002094 dated Jan. 6, 2011.
Nokia, "Speech Quality & Frame Stealing", GP-012503, 3GPP TSG GERAN #7 (Nov. 2001).
Office Action dated Jul. 6, 2012 from related U.S. Appl. No. 12/549,890.

* cited by examiner

ACCESS PROCEDURE FOR CALL RE-ESTABLISHMENT

FIELD

The application relates to access procedures for call re-establishment.

BACKGROUND OF THE INVENTION

In a GSM (Global System for Mobile communications) system, a mobile station (MS) making a voice call tracks a radio link counter, which is used to ensure the quality of the radio link (see 3GPP TS 45.008 Section 5.2). The radio link counter is used to measure the quality on the Slow Associated Control Channel (SACCH) associated with a connection (which may be used to carry a voice call). The SACCH is defined in 3GPP TS 45.002. At the start of a call, after handover, and after re-assignment, the radio link counter "S" is initialized to a network-defined Radio Link Timeout (RLT) value. After every bad SACCH block, S is decreased by 1. After every good SACCH block, S is increased by 2 (to a maximum value of RLT). If the radio channel conditions are bad, many radio blocks will be lost, and eventually the radio link counter will expire when the value of S equals the expiry value (zero). This event is termed Radio Link Failure (RLF), and at that point the device stops using the traffic channel.

The following are some commonly-seen problems leading to radio link failure:
a) Rapid radio channel degradation (e.g., due to sudden co-channel interference, an MS operating near the sensitivity limits, etc). In this case, the network may try to send a handover command to the MS, but the MS will not be able to decode and act on it. Thus, it will be "stuck" in the cell until RLF occurs.
b) The network not sending a handover message in time to avoid RLF. This could be because the handover target cell is too congested to support another call.
c) Uplink interference and/or limit-of-sensitivity (due to limited transmit power) issues. In this case, even if the MS can receive the downlink signalling, the network may not be able to decode the MS transmissions, which will result in the MS being unable to handover successfully (for example, because measurement reports from the MS are not decoded).

In GSM cells that have an enabled call re-establishment (CRE) feature (see, for example, 3GPP TS 24.008 Section 4.5.1.6, 3GPP TS 45.008 Section 6.7.2), there is a method for the MS to recover from RLF. If the mobile station is not able to access any cell which has CRE enabled, RLF results in a call drop.

If the mobile station is able to access one or more cells that have CRE enabled, a MS can use a CRE procedure, that involves finding the best cell (either a new cell, or the current cell) having an enabled call re-establishment feature, by acquiring the relevant system information (SI) messages; sending a message on the Random Access Channel (RACH) requesting a call re-establishment; and then after receiving an immediate assignment, sending a CM (connection management) Re-establishment Request message.

Successful call re-establishment allows the device to re-establish the traffic channel and to continue the call without interruption (the user does not need to manually re-dial the call and wait for the other party to answer).

An existing approach to attempting call re-establishment involves selecting the target cell, then completing an Immediate Assignment procedure. This involves repeating the process of {sending a request; waiting a random time} up to MAX_RETRANS times, and then starting a 5 second timer to ascertain that no response is coming after the last channel request message is sent. (Spacing between Channel Request messages is specified by the algorithm in 44.018 Immediate Assignment Procedure). The same procedure can be started on a subsequent cell, but not before the entire procedure (including all MAX_RETRANS iterations on the first cell, and the 5 second timeout) has been completed in the previous one.

In some cases, a mobile station will not attempt call re-establishment, even if RLF has occurred and the mobile is able to access one or more cells with CRE enabled. This is dependent on the use of the connection between the MS and the network. If the mobile station does not have an ongoing call, or all ongoing calls are in the in the call establishment or call clearing phase, i.e. any state other than the "active" state or the "mobile originating modify" state (see 3GPP TS 24.008 v.8.5.0) then call re-establishment will not be attempted, and the connection will be terminated.

BRIEF DESCRIPTION OF THE DRAWINGS

Embodiments of the application will now be described with reference to the attached drawings in which.

DETAILED DESCRIPTION

Paragraph 1. A broad aspect of the disclosure provides a method in a mobile station, the method comprising: in at least some instances of detecting radio link failure, attempting call re-establishment on multiple cells concurrently.

Paragraph 2. Another broad aspect of the disclosure provides the method of paragraph 1 comprising: performing received signal level measurements for a set of cells; selecting the multiple cells based at least on received signal level measurements taken on the set of cells.

Paragraph 3. Another broad aspect of the disclosure provides the method of paragraph 1 further comprising: determining a set of candidate cells according to a first criteria or criterion; selecting the multiple cells from the set of candidate cells according to a second criteria or criterion.

Paragraph 4. Another broad aspect of the disclosure provides the method of paragraph 3 wherein: determining a set of candidate cells according to a first criteria or criterion comprise: performing received signal level measurements for a set of cells; including in the set of candidate cells a cell of the set of cells with a highest averaged received signal level; including in the set of candidate cells at least one cell of the set of cells with a next highest average received signal levels.

Paragraph 5. Another broad aspect of the disclosure provides the method of paragraph 3 wherein: determining a set of candidate cells according to a first criteria or criterion comprise: performing received signal level measurements for a set of cells; including in the set of candidate cells a cell of the set of cells with a highest averaged received signal level; including in the set of candidate cells at least one cell of the set of cells with a next highest average received signal levels if the next highest average received signal level is within a defined amount of the highest average received signal level.

Paragraph 6. Another broad aspect of the disclosure provides the method of any one of paragraphs 3 to 5 wherein selecting the multiple cells from the set of candidate cells according to a second criteria or criterion comprises selecting the multiple cells subject to at least one of: a first requirement that call re-establishment for a candidate cell may only be requested if the mobile station has a set of parameters required to perform cell reselection to the candidate cell, the candidate cell is suitable, and call re-establishment is allowed; a second requirement that the timing of expected corresponding responses from the multiple cells is such that the mobile station will be able to receive a response on a first candidate cell of the multiple cells notwithstanding monitoring for a response from a second candidate cell of the multiple cells.

Paragraph 7. Another broad aspect of the disclosure provides the method of paragraph 1 wherein: in at least some instances of detecting radio link failure, attempting call re-establishment on multiple cells concurrently comprises: transmitting a respective at least one request for call re-establishment to each of at least one cell; in the event no positive response is received to any of the respective at least one request for call re-establishment to each of at least one cell, concurrently transmitting a respective at least one request for call re-establishment to each of at least two cells.

Paragraph 8. Another broad aspect of the disclosure provides the method of paragraph 7 wherein transmitting a respective at least one request for call re-establishment to each of at least one cell consists of transmitting one request for call re-establishment to one cell.

Paragraph 9. Another broad aspect of the disclosure provides the method of any one of paragraphs 1 to 8 wherein attempting call re-establishment on multiple cells concurrently comprises transmitting a request for call re-establishment to a first cell and then transmitting a request for call re-establishment to a second cell without first waiting to see if there is a positive response to the request for call re-establishment to the first cell.

Paragraph 10. Another broad aspect of the disclosure provides the method of any one of paragraphs 3 to 9 further comprising: ranking the candidate cells using a ranking scheme; using the ranking scheme to select the multiple cells.

Paragraph 11. Another broad aspect of the disclosure provides the method of paragraph 10 wherein the ranking scheme is a function of at least one of: received signal quality; received signal strength; received signal strength proximity for multiple cells; timing of first available opportunity to transmit a request for call re-establishment to a given cell.

Paragraph 12. Another broad aspect of the disclosure provides the method of any one of paragraphs 1 to 11 wherein: attempting call re-establishment on a cell comprises transmitting a Channel Request message with cause code Call Re-establishment on a Random Access Channel of the cell.

Paragraph 13. Another broad aspect of the disclosure provides the method of any one of paragraphs 1 to 12 wherein attempting call re-establishment on a cell comprises: attempting to receive a CCCH (common control channel) of the cell.

Paragraph 14. Another broad aspect of the disclosure provides the method of paragraph 13 further comprising: if one or more Immediate Assignments on the CCCH of any of the cells to which Channel Request was transmitted are received, proceeding with further steps to complete re-establishment.

Paragraph 15. Another broad aspect of the disclosure provides the method of paragraph 14 wherein proceeding with further steps to complete re-establishment comprises proceeding with further steps to complete call re-establishment with the cell from which an earliest of said one or more Immediate Assignment messages was received.

Paragraph 16. Another broad aspect of the disclosure provides a mobile station configured to implement the method of any one of paragraphs 1 to 15.

Paragraph 17. Another broad aspect of the disclosure provides a computer readable medium having computer executable instructions stored thereon which when executed by a mobile station cause the mobile station to execute the method of any one of paragraphs 1 to 15.

Paragraph 18. Another broad aspect of the disclosure provides a method in a mobile station comprising: performing a first random access channel procedure when the mobile station is not aware of at least two cells with enabled call re-establishment; performing a second random access channel procedure when the mobile station is aware of at least two cells with enabled call re-establishment.

Paragraph 19. Another broad aspect of the disclosure provides the method of paragraph 18 wherein the second random access channel procedure is any procedure that allows attempts to be made on multiple cells sooner than allowed by the first random access channel procedure.

A network may only allow for call re-establishment within a short time of RLF. The chances of successful call re-establishment can be enhanced by minimizing the amount of time taken for various steps in the call re-establishment process.

In some systems, a RACH (random access channel) is used to send the requests for call re-establishment in the form of a Channel Request. A RACH is shared amongst many or all users of a particular cell. It is used for initial access, when a mobile station does not have proper time alignment with the cell, in order to request assignment of a dedicated channel. The procedure is described in 3GPP 44.018 Section 3.3 "RR Connection Establishment", in particular the RACH is used to transmit the Channel Request message, the Channel Request message being defined in 3GPP 44.018, Section 9.1.8.

In systems employing the RACH to transmit a Channel Request with cause code call re-establishment, an aspect which consumes time during this phase is potentially having to transmit the Channel Request up to MAX_RETRANS times to a single target cell, if the target cell does not respond due to interference, congestion, or other problems.

According to the current specification (see 3GPP 45,008), the MS must choose one cell in which to send the call re-establishment RACH transmission. The MS then makes a number of attempts to send the RACH transmission, each time waiting for a response on the Common Control Channel (CCCH). After the first cell's re-transmission attempts are exhausted and the MS has waited for a period, the MS may attempt call re-establishment on a further cell, and so on, until an attempt is successful, no further cell is available on which to attempt re-establishment, or the time period allowed for call re-establishment expires. If call re-establishment is not successful, the MS then drops the call In the case where there is some problem with the first chosen cell and the RACH response comes after many retransmissions, the potential impacts are degradation of perceived user audio quality, and potential CRE failure due to timeout on the network side.

Embodiments of the disclosure provide an access procedure for call re-establishment.

Figure 1:
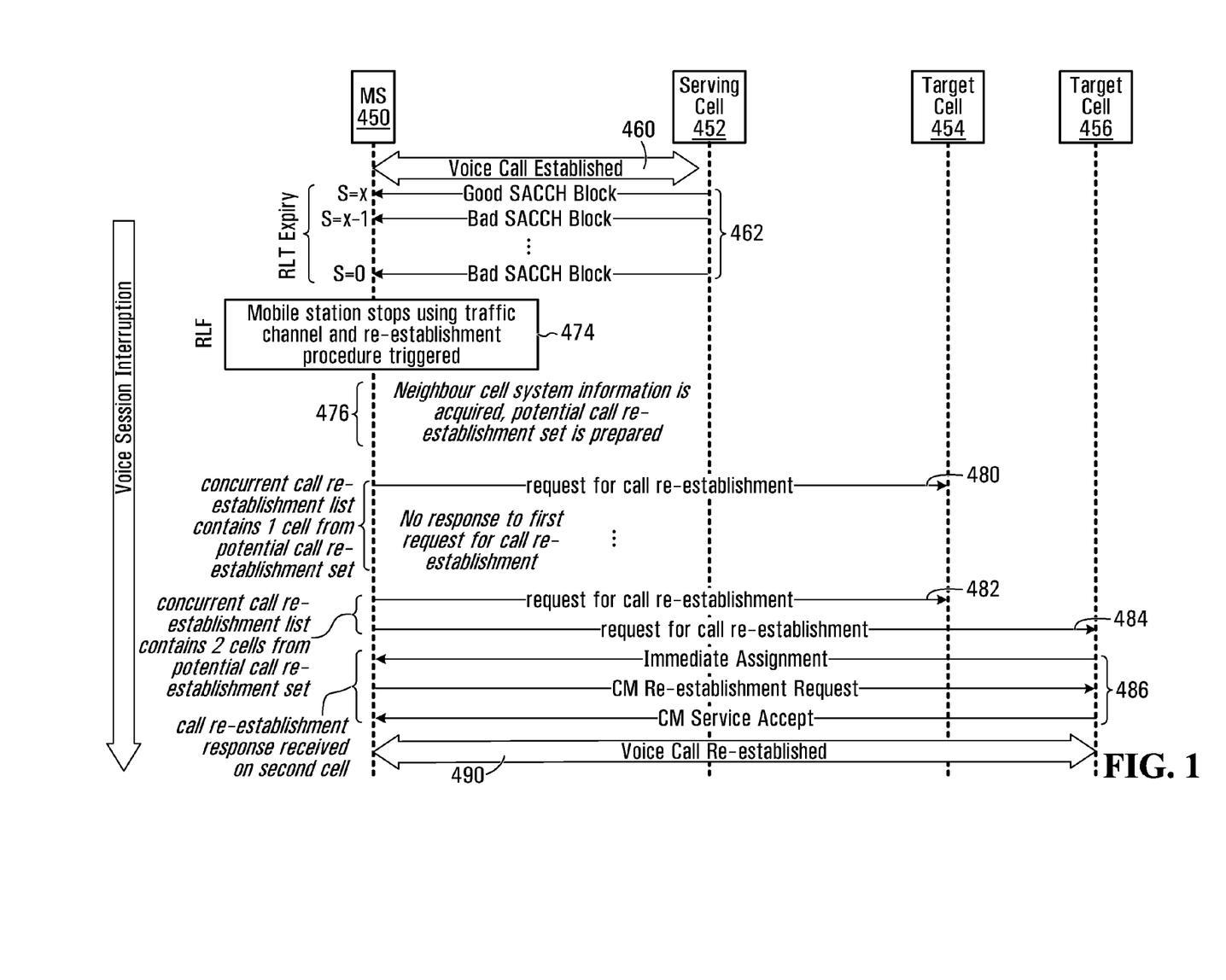
FIG. 1 shows a method of call re-establishment featuring concurrent requests for call re-establishment.

The method will first be described by way of example with reference to FIG. 1. FIG. 1 shows the interaction between a mobile station 450, a serving cell 452, a first target cell 454 and a second target cell 456. At 460, there is an ongoing voice call established using uplink and downlink traffic channels between the MS 450 and the serving cell 452 (although the other end of the voice call would typically be elsewhere, not shown). At 462, the serving cell transmits SACCH (slow associated access channel) blocks, typically periodically. The first of these is received as a "good SACCH block" by the mobile station 450, with the remainder being "bad SACCH blocks" meaning the mobile station did not successfully receive them. Reference to a "cell transmitting" something refers to some network equipment making a transmission, for example a cell controller, such as a base station subsystem (BSS) which might, for example, have base station transceiver (BTS) and base station controller (BSC). The particular sequence of "good" and "bad" blocks is an example only. There may be one, some, many, or even no good SACCH blocks before the "bad" ones start. It is also possible that there are good blocks mixed in with the bad ones. The MS 450 maintains a radio link counter S which is incremented or decremented based on whether the SACCH blocks are successfully received. At the end of period 462, the counter has expired, this being referred to as "RLT expiry" in FIG. 1. The MS stops using the traffic channel after the RLT counter expiry at 474. More generally, the mobile station somehow determines that radio link failure has occurred. The mobile station initiates a call re-establishment procedure. At 476, neighbour cell system information is acquired and a potential call re-establishment set is prepared. Note, however, this may alternatively have been obtained in advance, for example uses one of the examples taught in commonly assigned application no <attorney docket 52404-244> entitled "Method and System for Acquisition of Neighbour Cell Information", filed the same day as this application. The potential call re-establishment set is a set of candidate cells for call re-establishment. Of this set, a concurrent call re-establishment list is defined which contains at least one target cell, in this example target cell 454. The concurrent call re-establishment list contains a set of one or more cells selected from the potential call re-establishment set for which the mobile station will attempt call re-establishment. This will occur concurrently if there are two or more cells in the list. Call re-establishment signalling then begins. A request for call re-establishment is transmitted to the cells of the concurrent call re-establishment list, in this case this including only the first target cell 454. In the event the mobile station receives a positive response from the first target cell 454 the process continues with further call re-establishment signalling with the first target cell 454; this scenario is not illustrated. In the event the mobile station does not receive a positive response to the first request for call re-establishment, as is the case in the illustrated example, then the concurrent call re-establishment list is updated to include two cells from the potential call re-establishment set, target cells 454 and 456 in the illustrated example. The mobile station then sends a call re-establishment request to each of the two cells in the concurrent call re-establishment list, namely a request 482 to the first target cell 454, and a second request at 484 to the second target cell 456. These are sent sequentially in the illustrated example, but the second target cell 456 responds positively and further re-establishment signalling 486 to re-establish the call with the second target cell 456 is performed. In the illustrated example, this includes the second target cell 456 responding with an Immediate Assignment; the MS 450 transmitting a CM Re-establishment Request; the second target cell 456 transmitting a CM Service Accept. Then, as indicated at 490, the voice call is re-established.

In the above description, the MS attempts call re-establishment on multiple cells concurrently when the concurrent cell list contains two or more cells. Concurrent attempts at call re-establishment occur at least partially in parallel. For example, if the MS has the ability to transmit multiple requests simultaneously because it has multiple transmitters, this will be an example of concurrent attempts at call re-establishment.

In another example, the MS transmits a first request to a first cell. The MS transmits a second request to a second cell before it knows the outcome of the first request, for example, before at least one or even all of the one or more times possible for receiving a response to the first request. In this sense, attempts at call re-establishment to the two cells occur concurrently.

The MS listens for a possible response to each request. For each request there may be one or more times possible for receipt of a response. In this case, listening for a possible response to a given request involves listening for the one or more times possible for receipt of a response.

In some embodiments, each request for call re-establishment is a Channel Request message, with cause code call re-establishment. However, other messages may be used.

In some embodiments, in order to allow the selection of which target cells to transmit the request for call re-establishment to, during the call, the mobile station tracks various parameters associated with neighbour cells. This might, for example, include received signal strength indicator (RSSI) and system information of the serving cell and the neighbour cells. In addition, the device may also track the estimated signal quality for each cell, e.g., using bit error rate (BER) (estimated for example based on the traffic channel for the serving cell, and any blocks that may have previously received from the neighbour cells).

Potential Call Re-establishment Set

In some embodiments, a potential call re-establishment set is created which contains a set of cells that may be suitable for call re-establishment. The potential call re-establishment set may for example include the serving cell and one or more neighbour cells, although the serving cell need not be included in all cases. In some embodiments, the one or more neighbour cells consist of up to a predetermined number of cells, for example up to 6 cells. In some embodiments, the potential call re-establishment set is created after RLF. However, in some embodiments, at least part of this preparation can be done earlier. For example, if there are cells which do not have re-establishment enabled, they will not be part of the potential call re-establishment set, and these cells can be removed from consideration immediately.

Various criteria can be used to select the cells to include in the potential call re-establishment set. The cells are selected based on some signal characteristic in some embodiments. In some embodiments, the signal characteristic is received signal level. The received signal levels can, for example, be determined by measuring carrier(s) indicated in the BA (BCCH (Broadcast Control Channel) Allocation) received from the serving cell. The BA tells us which carriers are used by the neighbour cells. The received signal level for the serving cell can, for example, be determined by measuring the serving cell BCCH carrier. A specific example of a signal characteristic is received signal level value averaged over some period, for example the last 5 seconds.

In some embodiments, the cell having the highest averaged signal level is included in the set, and for other cells to be included, they must have an averaged signal level within some amount of the highest averaged signal, for example within 10 dB.

In some embodiments, the cells in the potential call re-establishment set are ranked according to a ranking scheme. The ranking scheme may include one criterion or a combination of criteria. Having ranked the cells according to the ranking scheme, the ranking is used to select cells for the concurrent call re-establishment list.

The following is a non-limiting set of criteria that may be used in such a ranking scheme:
- received signal strength—for example, cells which have substantially stronger RSSI can be given a higher priority for set selection, and/or a higher ranking within the chosen set;
- received signal quality—cells with a higher quality (e.g. BER) may be ranked high;
- signal strength proximity—for example cells which have RSSIs which are within X dB (where X is a configurable parameter) from each other may be ranked by estimated signal quality, where cells with higher quality (e.g., lower BER) are ranked higher. In other words, if the RSSIs are very close, cells can be re-arranged by using the quality, recognizing that a difference in quality may be more important than a slight difference in RSSI;
- timing of first available request opportunity—for example cells which are similar by one or more selected criteria may be ranked such that the cell which will have the first available RACH opportunity is ranked higher. There are predetermined intervals for RACH transmission to a given cell, typically defined in system information for the cell. As such, with knowledge of the next available time for each of the cells, selecting the cell with an earlier RACH transmission opportunity will shorten the average time slightly.

Concurrent Call Re-establishment List

The concurrent call re-establishment list is selected from the potential call re-establishment set. In some embodiments, call re-establishment for a candidate cell (and thus the inclusion of the candidate cell in the concurrent call re-establishment list) requires that the mobile station have a set of parameters required to perform cell reselection to the candidate cell, the candidate cell be suitable and call re-establishment is enabled by the cell. The MS may obtain this information, for example, by listening to a candidate cell's BCCH channel. For the serving cell, it is possible that the parameters it received from the serving cell prior to RLF are still sufficiently up to date. It is possible that these parameters are also up to date for one or more of the neighbour cells. This may occur after a handover when the old serving cell becomes a neighbour cell.

In the above, a suitable cell is one on which a MS may camp. An example set of criteria (defined in 3GPP 43.022 section 3.2.1) are:
i) It should be a cell of the selected PLMN (public land mobile network) or, if the selected PLMN is equal to the last registered PLMN, an equivalent PLMN;
ii) It should not be "barred";
iii) It should not be in an LA (location area) which is in the list of "forbidden LAs for roaming";
iv) The radio path loss between MS and BTS (basestation transceiver system) must be below a threshold set by the PLMN operator.

v) It should not be a SoLSA exclusive cell to which MS does not subscribe. This requirement is only valid for MSs supporting SoLSA.

Other criteria can alternatively or additionally be employed.

A MS may keep track of the timing of each of the cells. In a particular example, the cells all transmit FCCH (frequency correction channel) and SCH (Synchronization channel) channels in order to enable the MS to keep track of the cell timing. Cell timing can, for example, consist of Frame Number and slot number.

In some embodiments, selection of cells for the concurrent call re-establishment list is subject to a requirement that the timing of expected corresponding responses from the multiple cells is such that the mobile station will be able to receive a response on a first candidate cell of the multiple cells notwithstanding monitoring for a response from a second candidate cell of the multiple cells. In some embodiments the mobile station has a dual downlink receiver enabling the mobile station to receive on two channels simultaneously. In this case, multiple requests for call re-establishment scheduling can be employed to account for the simultaneous reception capability.

In some embodiments, the following approach is used to define and update a concurrent call re-establishment list. Starting with an empty list, add the $N_{initial}$ (a configurable parameter) highest-ranked cell(s) in the potential call re-establishment set to the current-call re-establishment list. Applying the $N_{initial}$ nomenclature to the example of FIG. 1, $N_{initial}$ is 1, but a different value can alternatively be employed. The mobile station then transmits a request for call re-establishment on each cell in the concurrent-call re-establishment list. If no response is received to any of the requests within a certain time period, either because no response was sent, or because the mobile station was not able to decode the message, or if a rejection (such as an Immediate Assignment Reject) is received, the mobile station continues by adding the next-highest $N_{follow}$ (a configurable parameter) cell(s) in the potential call re-establishment set to the concurrent call re-establishment list. If a rejection is received, the cell which sent the rejection can be removed from the list, optionally replaced with another cell. Applying the $N_{follow}$ nomenclature to the example of FIG. 1, $N_{follow}$ is 1, but a different value can be employed. In addition, $N_{follow}$ might not be a constant. For example, the first time the concurrent call re-establishment list is enlarged, one cell might be added; the next time, two cells added, and so on. The mobile station then transmits a request for call re-establishment on each cell in the concurrent call re-establishment list. If a positive response is received, the mobile station continues with the call re-establishment procedure by using a dedicated resource allocated in the first positive response.

In the above-described embodiment, the mobile station starts transmitting requests for call re-establishment to a larger set of cells after failure of a single request to each cell in the initial set. In some embodiments, the mobile station transmits multiple requests to each cell in the initial set before starting to transmit requests to a larger set.

In some embodiments, the immediate assignment procedure specified in 3GPP TS 44.018 v.9.0.0 is applied independently for each candidate cell on which call re-establishment is attempted.

In some embodiments, after some configurable number of attempts, the mobile station need not use every opportunity permitted for transmitting a request for call re-establishment. The procedure may, for example, continue with any unused opportunity being considered as having been attempted.

In some embodiments, the mobile station may stop sending requests for call re-establishment and start a timer for a given candidate cell. Upon expiry of the timer, the call re-establishment procedure is aborted for that candidate cell.

In some embodiments, after unsuccessfully trying the cells of the larger set of neighbour cells, the call re-establishment attempt is abandoned.

In some embodiments, the MS is configured to not be able to access a cell to attempt call re-establishment later than some configurable time, for example 20 seconds, after the detection within the MS of the radio link failure causing the call re-establishment attempt. In the case where the configurable time elapses without a successful call re-establishment, the call re-establishment attempt is abandoned.

In some embodiments, the above-introduced RACH is used to send the requests for call re-establishment in the form of Channel Request messages.

Using the RACH, a MS sends a Random access burst, this being a special type of transmission which is shorter than a regular burst. The base station will measure a timing offset based on the request, and will tell the MS to adjust its timing, as part of a response called an "Immediate Assignment" message. Another part of the Immediate Assignment response is a set of information regarding a dedicated channel to use.

After an Immediate Assignment, the MS switches to the dedicated resources and does not use the RACH any more (until the next time it has to regain access, either on this cell or new cell).

The Immediate Assignment message is sent using a CCCH (common control channel). The CCCH has a number of resources, some of which are reserved for an AGCH (access grant channel), this being a portion of the CCCH dedicated to sending access grant (e.g. Immediate Assignment) messages. However, the Immediate Assignment message maybe sent on CCCH resources other than those reserved for the AGCH, and as such the MS listens to the full CCCH from the base station. More specifically, the timing for GSM is defined based on GSM multiframes each comprised of 51 eight-slot (slots 0 to 7) frames. The CCCH may, for example, appear on slot 0 of carrier C0 of a given cell in a defined set of frames. Alternatively, the MS may be assigned to a CCCH group, each CCCH group having an associated slot number that members of the group monitor to receive the CCCH. The defined set of frames depends on the cell configuration, and can be determined from the system information. The mapping of the CCCH is given in 3GPP TS 45.002.

Where the RACH/CCCH channels are employed, the mobile station may be configured to not transmit Channel Request messages on a RACH channel of a candidate cell if it will not be capable of receiving the corresponding response messages (e.g. Immediate Assignment on the downlink CCCH), for example, because it has engaged an Immediate Assignment procedure in a second candidate cell, monitoring the corresponding downlink CCCH would prevent the reception of the response message in the second cell. Based on knowledge of a set of one or more possibilities when responses from a given cell are possible (for example knowledge of the CCCH of a given cell), a mobile station needs to be able to listen to all of the possibilities.

In some embodiments, the mobile stations identify concurrent call re-establishment cells as a function of cell timing. This can be achieved by evaluating the frame number and slot number for each cell and from the frame number and slot number, and determining the amount of offset between the multiframe structure of each cell. This offset can be a result of two factors: the cells may have different frame timing, which means that the CCCH is transmitted at different "real" times on the two cells, and also the timeslots of each cell may not be aligned (so timeslot 0 of cell A and of cell B may be at different "real" times as well). Using the cell timing thus identified, the mobile station identifies for each cell a set of times it needs to be able to listen to the CCCH for that cell for an Immediate Assignment, should the mobile station have sent a Channel Request message to that cell. In some embodiments, having regard to the cell timing determined by the mobile station, the mobile station selects cells that do not have overlapping CCCHs such that responses from multiple cells could not overlap in time.

SPECIFIC EXAMPLE

The following is a specific implementation example that combines several of the optional aspects described above.

In the event of a radio link failure, call re-establishment may be attempted on one or more GSM cells (according to the procedure in 3GPP TS 44.018 v.9.0.0) concurrently. The MS performs the following method to determine which cell(s) to use for the call re-establishment attempt.

i) The received signal level measurement samples taken on the carriers indicated in the BA received on the serving cell and on the serving cell BCCH carrier in the last 5 seconds are averaged;

ii) The carrier with the highest average received signal level with a permitted NCC (network colour code) as indicated on the SACCH of the serving cell is be considered a candidate cell; a "permitted NCC" is a NCC value which the MS is allowed to camp on.

iii) In addition, the at most N (N≥1, for example 3) carriers with next highest averaged received signal levels, where the averaged received signal level is no more than a defined amount Z (for example 10 dB) below that of the carrier identified in step ii), with a permitted NCC as indicated on the SACCH of the serving cell may be considered a candidate cell;

iv) Call re-establishment may be attempted on multiple cells concurrently with the following restrictions:

call re-establishment for a candidate cell may only be attempted if the MS has successfully decoded either from the BCCH of the target cell or within a defined period (the defined period is implementation specific, for example the last 120 seconds from the serving cell, the parameters required to perform cell reselection (i.e. cell selection, control channel and RACH parameters), the cell is suitable (see 3GPP TS 43.022) and call re-establishment is allowed;

the immediate assignment procedure specified in 3GPP TS 44.018 applies independently for each candidate cell on which call re-establishment is attempted;

except for the first Y (for example 2) opportunities allowed on each cell or the cell identified in step ii) above, the mobile station need not use every opportunity permitted for transmitting a Channel Request message—the procedure continues with any unused opportunity being considered as having been attempted;

the mobile station does not transmit Channel Request messages on the RACH channel of a candidate cell if it will not be capable of receiving the corresponding response messages (e.g. IMMEDIATE ASSIGNMENT) on the downlink CCCH (e.g. because it has engaged the Immediate Assignment procedure in a second candidate cell and monitoring the corresponding downlink CCCH would prevent the reception of the response messages in the second cell);

v) The mobile station may stop sending Channel Request messages and start a timer for a given candidate cell at any time (but in any case no later than indicated by 3GPP TS 44.018 v.9.0.0).

vi) If, for any candidate cell, the MS is unable to decode the necessary BCCH data blocks, the conditions in step iii) are not met, or the timer has expired, the carrier with the next highest average received signal level with a permitted NCC may be considered a candidate cell.

vii) If the cells with the 6 (or some other defined number) strongest average received signal level values with a permitted NCC have been tried but cannot be used, the call re-establishment attempt is abandoned.

In some embodiments, the MS is only allowed to access a cell to attempt call re-establishment for some window of time, for example 20 seconds, after the detection within the MS of the radio link failure causing the call re-establishment attempt. In the case where the window of time elapses without a successful call re-establishment, the call re-establishment attempt is abandoned.

Figure 2:
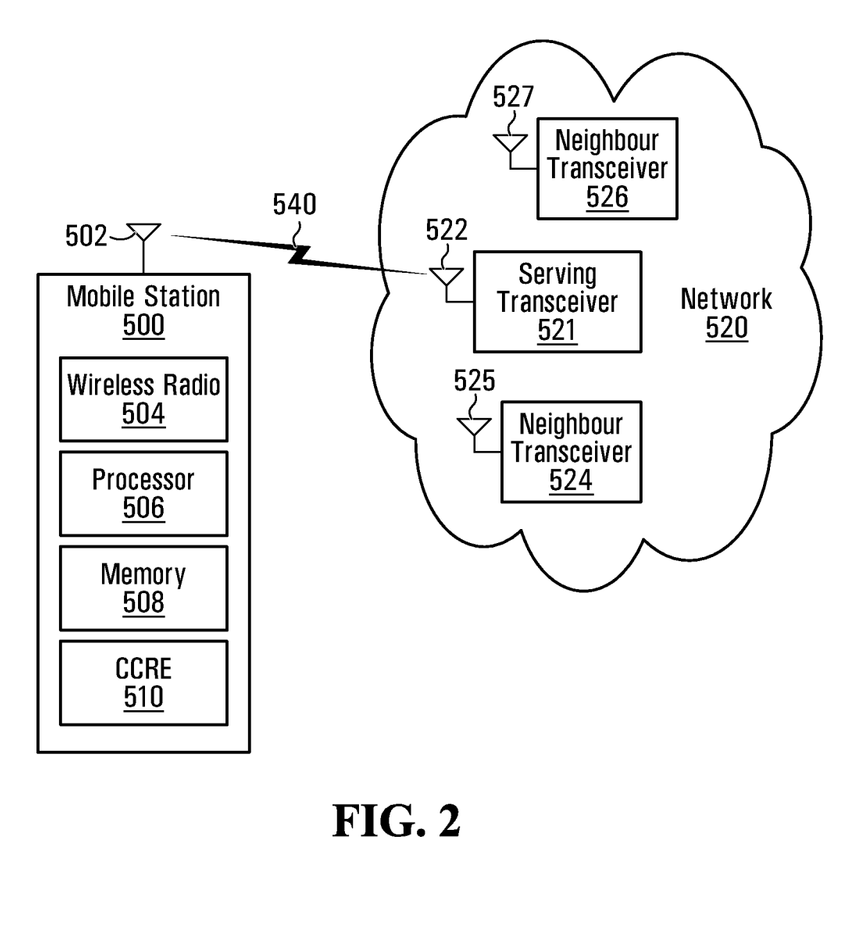
FIG. 2 shows a communication system including a mobile station and a wireless network.

Referring to FIG. 2, shown is a block diagram showing a mobile station 500 and a network providing wireless communication services. The mobile station 500 has at least one antenna 502, a processor 506, wireless radio 504 and device memory 508 which may include non-volatile RAM, ROM and or volatile RAM. The mobile station is shown with a single wireless radio 504, but in some embodiments, the mobile station may have multiple such wireless radios, for example if the mobile station is a multi-mode mobile station. The mobile station 500 has a CCRE (concurrent call re-establishments) module 510. Of course, the mobile station may have additional components to those shown, and the components shown may be arranged/combined/implemented differently than shown.

The mobile station 500 is configured, through inclusion of the CCRE module 510 which may be implemented in suitable hardware, firmware, and/or software stored in device memory 508, to perform any of the methods described above.

The network 520 is shown to include a serving transceiver 521 having at least one antenna 522. At the instant depicted, the mobile station 500 is obtaining wireless communications services via transceiver 521. Also shown are two neighbour transceivers 524,526 with associated antennas 525,527. Transceivers 521,524,526 may, for example be part of respective base stations.

It is to be understood that the network 520 would have any appropriate components suitable for a network providing wireless communications services. Note that the network 520 may include wires that interconnect network components in addition to components for providing wireless communication with mobile devices. The components of the network 520 are implementation specific and may depend on the type of wireless network. There are many possibilities for the wireless network. The wireless network might for example be a GSM network.

In operation, the mobile device 500 communicates with the network 520 over a wireless connection 540 between the mobile device 500 and the serving transceiver 521. The CCRE 510 of the mobile station 500 initiates concurrent call re-establishment attempts, for example to two or more of the three transceivers 521,524,526 for example, as described above.

Figure 3:
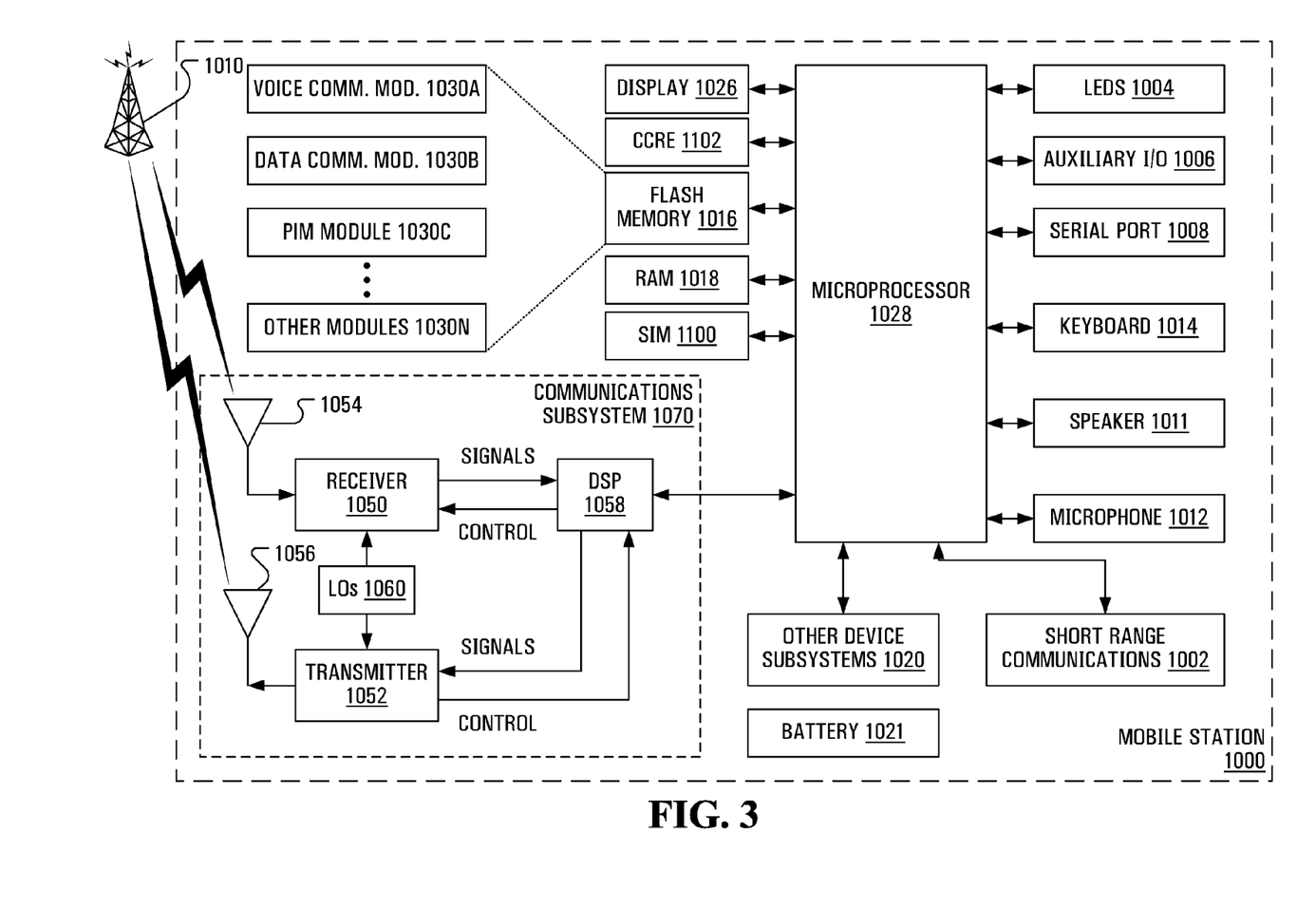
FIG. 3 is a block diagram of a mobile station.

Referring now to FIG. 3, shown is a block diagram of another mobile station 1000 that may implement mobile station related methods described herein. It is to be understood that the mobile station 1000 is shown with very specific details for example purposes only. The mobile station 1000 has CCRE 1102 which functions as per the CCRE 510 of FIG. 2 described above.

A processing device (a microprocessor 1028) is shown schematically as coupled between a keyboard 1014 and a display 1026. The microprocessor 1028 controls operation of the display 1026, as well as overall operation of the mobile station 1000, in response to actuation of keys on the keyboard 1014 by a user.

The mobile station 1000 has a housing that may be elongated vertically, or may take on other sizes and shapes (including clamshell housing structures). The keyboard 1014 may include a mode selection key, or other hardware or software for switching between text entry and telephony entry.

In addition to the microprocessor 1028, other parts of the mobile station 1000 are shown schematically. These include: a communications subsystem 1070; a short-range communications subsystem 1002; the keyboard 1014 and the display 1026, along with other input/output devices including a set of LEDS 1004, a set of auxiliary I/O devices 1006, a serial port 1008, a speaker 1011 and a microphone 1012; as well as memory devices including a flash memory 1016 and a Random Access Memory (RAM) 1018; and various other device subsystems 1020. The mobile station 1000 may have a battery 1021 to power the active elements of the mobile station 1000. The mobile station 1000 is in some embodiments a two-way radio frequency (RF) communication device having voice and data communication capabilities. In addition, the mobile station 1000 in some embodiments has the capability to communicate with other computer systems via the Internet.

Operating system software executed by the microprocessor 1028 is in some embodiments stored in a persistent store, such as the flash memory 1016, but may be stored in other types of memory devices, such as a read only memory (ROM) or similar storage element. In addition, system software, specific device applications, or parts thereof, may be temporarily loaded into a volatile store, such as the RAM 1018. Communication signals received by the mobile station 1000 may also be stored to the RAM 1018.

The microprocessor 1028, in addition to its operating system functions, enables execution of software applications on the mobile station 1000. A predetermined set of software applications that control basic device operations, such as a voice communications module 1030A and a data communications module 1030B, may be installed on the mobile station 1000 during manufacture. In addition, a personal information manager (PIM) application module 1030C may also be installed on the mobile station 1000 during manufacture. The PIM application is in some embodiments capable of organizing and managing data items, such as e-mail, calendar events, voice mails, appointments, and task items. The PIM application is also in some embodiments capable of sending and receiving data items via a wireless network 1010. In some embodiments, the data items managed by the PIM application are seamlessly integrated, synchronized and updated via the wireless network 1010 with the device user's corresponding data items stored or associated with a host computer system. As well, additional software modules, illustrated as other software module 1030N, may be installed during manufacture. In addition, the microprocessor 1028 executes SRI updating and SRI reading functions.

Communication functions, including data and voice communications, are performed through the communication subsystem 1070, and possibly through the short-range communications subsystem 1002. The communication subsystem 1070 includes a receiver 1050, a transmitter 1052 and one or more antennas, illustrated as a receive antenna 1054 and a transmit antenna 1056. In addition, the communication subsystem 1070 also includes a processing module, such as a digital signal processor (DSP) 1058, and local oscillators (LOs) 1060. The specific design and implementation of the communication subsystem 1070 is dependent upon the communication network in which the mobile station 1000 is intended to operate. For example, the communication subsystem 1070 of the mobile station 1000 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile station 1000.

Network access may vary depending upon the type of communication system. For example, in the Mobitex™ and DataTAC™ networks, mobile stations are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile station 1000 may send and receive communication signals over the communication network 1010. Signals received from the communication network 1010 by the receive antenna 1054 are routed to the receiver 1050, which provides for signal amplification, frequency down conversion, filtering, channel selection, etc., and may also provide analog to digital conversion. Analog-to-digital conversion of the received signal allows the DSP 1058 to perform more complex communication functions, such as demodulation and decoding. In a similar manner, signals to be transmitted to the network 1010 are processed (e.g., modulated and encoded) by the DSP 1058 and are then provided to the transmitter 1052 for digital to analog conversion, frequency up conversion, filtering, amplification and transmission to the communication network 1010 (or networks) via the transmit antenna 1056.

In addition to processing communication signals, the DSP 1058 provides for control of the receiver 1050 and the transmitter 1052. For example, gains applied to communication signals in the receiver 1050 and the transmitter 1052 may be adaptively controlled through automatic gain control algorithms implemented in the DSP 1058.

In a data communication mode, a received signal, such as a text message or web page download, is processed by the communication subsystem 1070 and is input to the microprocessor 1028. The received signal is then further processed by the microprocessor 1028 for an output to the display 1026, or alternatively to some other auxiliary I/O devices 1006. A device user may also compose data items, such as e-mail messages, using the keyboard 1014 and/or some other auxiliary I/O device 1006, such as a touchpad, a rocker switch, a thumb-wheel, or some other type of input device. The composed data items may then be transmitted over the communication network 1010 via the communication subsystem 1070.

In a voice communication mode, overall operation of the device is substantially similar to the data communication mode, except that received signals are output to a speaker 1011, and signals for transmission are generated by a microphone 1012. Alternative voice or audio I/O subsystems, such as a voice message recording subsystem, may also be implemented on the mobile station 1000. In addition, the display 1016 may also be utilized in voice communication mode, for example, to display the identity of a calling party, the duration of a voice call, or other voice call related information.

The short-range communications subsystem 1002 enables communication between the mobile station 1000 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 4:
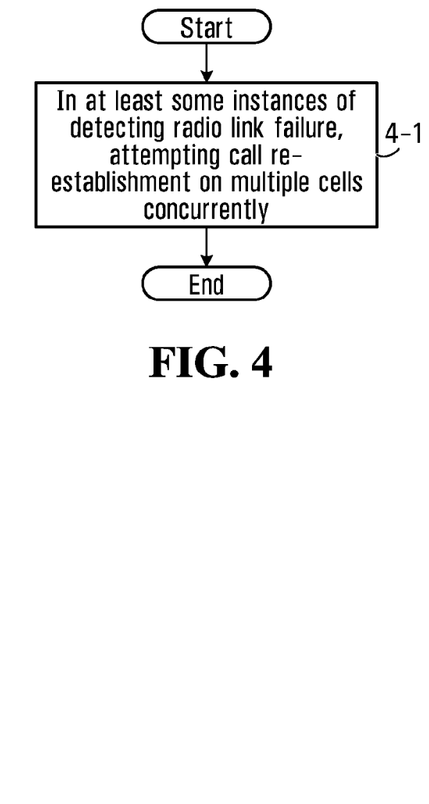
FIGS. 4, 5 and 6 are flowcharts relating to methods of call re-establishment in which attempts at call re-establishment to multiple cells are made concurrently.

Referring now to FIG. 4, a flowchart of a method for implementation in a mobile station will now be described. The method begins in block 4-1 with in at least some instances of detecting radio link failure, attempting call re-establishment on multiple cells concurrently.

In some embodiments, the method further involves performing received signal level measurements for a set of cells; selecting the multiple cells based at least on received signal level measurements taken on the set of cells.

Figure 5:
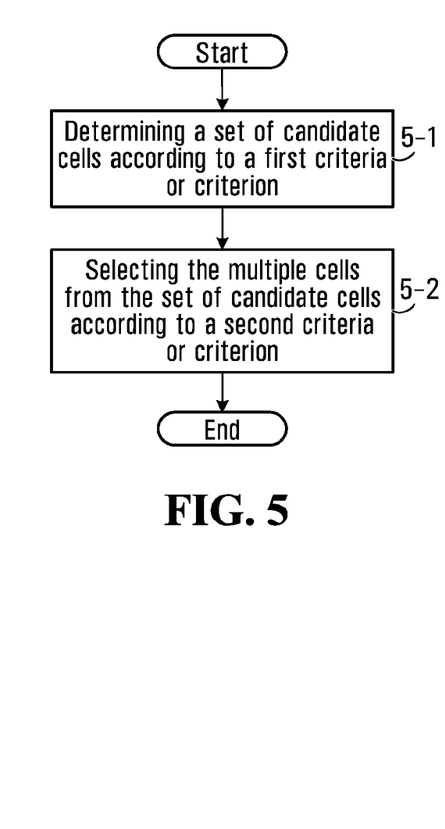

A flowchart of another method for implementation by a mobile station will now be described with reference to FIG. 5. This method depicts steps taken to determine the multiple cells referred to in block 4-1 above. The method begins in block 5-1 with determining a set of candidate cells according to a first criteria or criterion. The method continues in block 5-2 with selecting the multiple cells from the set of candidate cells according to a second criteria or criterion.

In some embodiments, determining a set of candidate cells according to a first criteria or criterion comprise: performing received signal level measurements for a set of cells; including in the set of candidate cells a cell of the set of cells with a highest averaged received signal level; including in the set of candidate cells at least one cell of the set of cells with a next highest average received signal levels.

Figure 6:
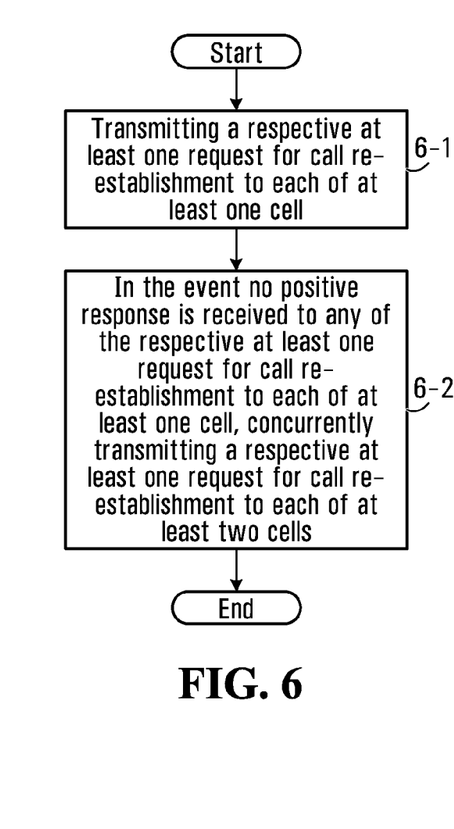

FIG. 6 is a flowchart of a method of an example of concurrent call re-establishment attempts following an initial call re-establishment attempt. The method begins at block 6-1 with transmitting a respective at least one request for call re-establishment to each of at least one cell. The method continues in block 6-2 with in the event no positive response is received to any of the respective at least one request for call re-establishment to each of at least one cell, concurrently transmitting a respective at least one request for call re-establishment to each of at least two cells. The call re-establishment attempts made in block 6-2 are concurrent attempts at call re-establishment.

In some embodiments, attempting call re-establishment on multiple cells concurrently comprises transmitting a request for call re-establishment to a first cell and then transmitting a request for call re-establishment to a second cell without first waiting to see if there is a positive response to the request for call re-establishment to the first cell.

In some embodiments, any of the methods described above further involves ranking the candidate cells using a ranking scheme; using the ranking to select the multiple cells.

As indicated in the background, an existing approach to attempting call re-establishment involves selecting the target cell, then completing an Immediate Assignment procedure. This involves repeating the process of {sending a request; waiting a random time} up to MAX_RETRANS times, and then starting a 5 second timer to ascertain that no response is coming after the last channel request message is sent. (Spacing between Channel Request messages) is specified by the algorithm in 44.018 Immediate Assignment Procedure). The same procedure can be started on a subsequent cell, but not before the entire procedure (including all MAX_RETRANS iterations on the first cell, and the 5 second timeout) has been completed in the previous one.

In another embodiment, a call re-establishment method is provided which removes the requirement that the entire immediate assignment procedure be completed on a first target cell before commencing an immediate assignment procedure on a second cell. For example, a mobile station may execute the process {send a request to a first cell; wait a random time} less than MAX_RETRANS times, and then send a request to a second cell. More generally, in some embodiments, the mobile station executes a first random access channel procedure (for example one in which all MAX_RETRANS attempts at the first cell are made before making an attempt on a second cell) when the mobile station is not aware of at least two cells (serving cell and/or neighbour cells) with enabled call re-establishment, and executes a second random access channel procedure (for example one in which less than all MAX_RETRANS attempts on the first cell are made before making an attempt on a second cell) when the mobile station is aware of at least two cells with enabled call re-establishment. In some embodiments, the second random access channel procedure is any procedure that allows attempts to be made on multiple cells (sequentially or concurrently) sooner than allowed by the first random access channel procedure.

In some embodiments, the mobile station is permitted to make an attempt on a different cell at any time. In some embodiments, this is subject to a restriction that the mobile station must be able to listen for responses to the various requests made.

Permission Indication

In some embodiments, a mobile station's use of any of the above-described embodiments is contingent on receiving an indication from the network (either from the serving cell or from a candidate cell, or from all candidate cells). In other words, the mobile station performs concurrent call re-establishment (or uses the so-called second random access channel procedure introduced above) only if it has received positive permission to do so.

Numerous modifications and variations of the present invention are possible in light of the above teachings. It is therefore to be understood that within the scope of the appended claims, the invention may be practiced otherwise than as specifically described herein.

We claim:

1. A method in a mobile station, the method comprising:
in at least some instances of detecting radio link failure, attempting call re-establishment on multiple cells concurrently;
wherein attempting call re-establishment on multiple cells concurrently comprises transmitting a request for call re-establishment to a first cell and then transmitting a request for call re-establishment to a second cell without first waiting to see if there is a positive response to the request for call re-establishment to the first cell.

2. The method of claim 1 comprising:
performing received signal level measurements for a set of cells;
selecting the multiple cells based at least on received signal level measurements taken on the set of cells.

3. The method of claim 1 further comprising:
determining a set of candidate cells according to a first criteria or criterion;
selecting the multiple cells from the set of candidate cells according to a second criteria or criterion.

4. The method of claim 3 wherein:
determining a set of candidate cells according to a first criteria or criterion comprise:
performing received signal level measurements for a set of cells;
including in the set of candidate cells a cell of the set of cells with a highest averaged received signal level;
including in the set of candidate cells at least one cell of the set of cells with a next highest average received signal levels.

5. The method of claim 3 wherein:
determining a set of candidate cells according to a first criteria or criterion comprise:
performing received signal level measurements for a set of cells;
including in the set of candidate cells a cell of the set of cells with a highest averaged received signal level;
including in the set of candidate cells at least one cell of the set of cells with a next highest average received signal levels if the next highest average received signal level is within a defined amount of the highest average received signal level.

6. A method in a mobile station, the method comprising:
in at least some instances of detecting radio link failure, attempting call re-establishment on multiple cells concurrently;
determining a set of candidate cells according to a first criteria or criterion;
selecting the multiple cells from the set of candidate cells according to a second criteria or criterion;
wherein selecting the multiple cells from the set of candidate cells according to a second criteria or criterion comprises selecting the multiple cells subject to at least one of:
a first requirement that call re-establishment for a candidate cell may only be requested if the mobile station has a set of parameters required to perform cell reselection to the candidate cell, the candidate cell is suitable, and call re-establishment is allowed;
a second requirement that the timing of expected corresponding responses from the multiple cells is such that the mobile station will be able to receive a response on a first candidate cell of the multiple cells notwithstanding monitoring for a response from a second candidate cell of the multiple cells.

7. The method of claim 1 wherein:
in at least some instances of detecting radio link failure, attempting call re-establishment on multiple cells concurrently comprises:
transmitting a respective at least one request for call re-establishment to each of at least one cell;
in the event no positive response is received to any of the respective at least one request for call re-establishment to each of at least one cell, concurrently transmitting a respective at least one request for call re-establishment to each of at least two cells.

8. The method of claim 7 wherein transmitting a respective at least one request for call re-establishment to each of at least one cell consists of transmitting one request for call re-establishment to one cell.

9. The method of claim 3 further comprising:
ranking the candidate cells using a ranking scheme;
using the ranking scheme to select the multiple cells.

10. The method of claim 9 wherein the ranking scheme is a function of at least one of:

received signal quality;
received signal strength;
received signal strength proximity for multiple cells;
timing of first available opportunity to transmit a request for call re-establishment to a given cell.

11. The method of claim 1 wherein:
attempting call re-establishment on a cell comprises transmitting a Channel Request message with cause code Call Re-establishment on a Random Access Channel of the cell.

12. The method of claim 1 wherein attempting call re-establishment on a cell comprises:
attempting to receive a CCCH (common control channel) of the cell.

13. The method of claim 12 further comprising:
if one or more Immediate Assignments on the CCCH of any of the cells to which Channel Request was transmitted are received, proceeding with further steps to complete re-establishment.

14. The method of claim 13 wherein proceeding with further steps to complete re-establishment comprises proceeding with further steps to complete call re-establishment with the cell from which an earliest of said one or more Immediate Assignment messages was received.

15. A mobile station configured to implement the method of claim 1.

16. A computer readable medium having computer executable instructions stored thereon which when executed by a mobile station cause the mobile station to execute the method of claim 1.

17. A method in a mobile station comprising:
performing a first random access channel procedure when the mobile station is not aware of at least two cells with enabled call re-establishment;
performing a second random access channel procedure when the mobile station is aware of at least two cells with enabled call re-establishment.

18. The method of claim 17 wherein the second random access channel procedure is any procedure that allows attempts to be made on multiple cells sooner than allowed by the first random access channel procedure.

* * * * *